United States Patent [19]
Bonnet

[11] Patent Number: 6,076,653
[45] Date of Patent: Jun. 20, 2000

[54] HIGH SPEED DRUM SORTING CONVEYOR SYSTEM

[75] Inventor: Henri Bonnet, Atlanta, Ga.

[73] Assignee: United Parcel Service of America, Inc., Atlanta, Ga.

[21] Appl. No.: 08/841,201

[22] Filed: Apr. 29, 1997

[51] Int. Cl.[7] .................................................. B65G 47/10
[52] U.S. Cl. ...................... 198/370.09; 198/814; 198/780
[58] Field of Search ........................... 198/370.09, 370.1, 198/814, 780, 690.2, 835, 370.08

[56] References Cited

U.S. PATENT DOCUMENTS

| | | |
|---|---|---|
| 982,920 | 1/1911 | Aab . |
| 1,114,621 | 10/1914 | Lewis . |
| 1,462,511 | 7/1923 | Lister . |
| 1,549,499 | 8/1925 | Parker . |
| 1,737,829 | 12/1929 | Cosgrove . |
| 1,959,157 | 5/1934 | Eggleston . |
| 2,062,604 | 12/1936 | Paxton . |
| 2,622,720 | 12/1952 | Lorig . |
| 3,026,988 | 3/1962 | Fisk . |
| 3,138,238 | 6/1964 | De Good et al. . |
| 3,189,161 | 6/1965 | Schneider et al. . |
| 3,231,068 | 1/1966 | Harrison et al. . |
| 3,253,692 | 5/1966 | Ota ...................................... 198/835 X |
| 3,286,811 | 11/1966 | McWilliams . |
| 3,291,287 | 12/1966 | Rehm .................................. 198/835 X |
| 3,348,678 | 10/1967 | Flowers . |
| 3,369,646 | 2/1968 | Musser . |
| 3,552,541 | 1/1971 | Riggs . |
| 3,642,113 | 2/1972 | Burgis ........................................ 198/25 |
| 3,724,643 | 4/1973 | Kohl . |
| 3,782,527 | 1/1974 | Petershack ............................... 198/25 |
| 3,880,751 | 4/1975 | Wirth . |
| 3,918,572 | 11/1975 | Wirth et al. . |
| 4,143,755 | 3/1979 | Keller ...................................... 198/456 |
| 4,295,559 | 10/1981 | Neal et al. . |
| 4,509,636 | 4/1985 | Godbois .................................. 198/372 |
| 4,583,637 | 4/1986 | Ferguson . |

(List continued on next page.)

FOREIGN PATENT DOCUMENTS

| | | |
|---|---|---|
| 2 164 831 | 8/1973 | France . |
| 2 255 235 | 7/1975 | France . |
| 2256092 | 8/1975 | France . |
| 2 407 149 | 5/1979 | France . |
| 25 47 899 | 4/1977 | Germany . |
| 28 18 425 | 11/1979 | Germany . |
| 1316954 | 6/1987 | U.S.S.R. . |
| 1514708 | 10/1989 | U.S.S.R. . |
| 0 287 171 | 10/1988 | WIPO . |

*Primary Examiner*—Douglas Hess
*Assistant Examiner*—Steven B. McAllister
*Attorney, Agent, or Firm*—Jones & Askew, LLP

[57] ABSTRACT

An automated conveyor sortation and item discharge system for sorting items of various sizes and weights to designated output destinations along a conveyor is provided. The system utilizes a discharge drum ejection mechanism mounted medially between a pair of parallel cog belt conveyors for ejecting an item such as a parcel laterally from the surface of the cog belt conveyors to an adjacent chute or slide. The discharge drum of the ejection mechanism is generally rectangular and defines convex opposing sides separated by the longer diameter of the drum. The convex sides of the discharge drum define flexible ridges for contacting an overlying parcel to be discharged from the surfaces of the cog belt conveyors. The flexible ridges enhance translation of the item or parcel by the discharge drum and serve to reduce noise caused by the impact of the discharge drum with the overlying parcel. A tapered discharge drum may be used to counteract rotation of the parcel during discharge. A programmable controller may be provided to control the conveyor system and the discharge of items from the conveyor by the ejection mechanisms. The system is easy to repair and operates at high speeds at reduced noise levels.

25 Claims, 6 Drawing Sheets

U.S. PATENT DOCUMENTS

| | | |
|---|---|---|
| 4,598,815 | 7/1986 | Adama . |
| 4,633,996 | 1/1987 | Waterhouse . |
| 4,696,386 | 9/1987 | Lem ........................................ 198/372 |
| 4,732,260 | 3/1988 | Canziani . |
| 4,798,275 | 1/1989 | Leemkuil et al. . |
| 4,979,606 | 12/1990 | Usui . |
| 5,027,939 | 7/1991 | Kilper et al. . |
| 5,107,982 | 4/1992 | Walter . |
| 5,127,510 | 7/1992 | Cotter et al. . |
| 5,348,132 | 9/1994 | Maier . |
| 5,388,681 | 2/1995 | Bonnet . |
| 5,402,996 | 4/1995 | Long ................................... 198/835 X |
| 5,415,273 | 5/1995 | Peterson ............................. 198/835 X |
| 5,421,446 | 6/1995 | Koch et al. . |
| 5,433,311 | 7/1995 | Bonnet . |
| 5,477,955 | 12/1995 | Madden et al. . |
| 5,586,639 | 12/1996 | Yoshino ............................... 198/690.2 |

HIGH SPEED DRUM SORTING CONVEYOR SYSTEM

FIELD OF INVENTION

This invention relates to automated sorting of items such as parcels to a variety of output destinations, and more particularly relates to a system utilizing a discharge drum ejection mechanism for discharging items from a pair of parallel cog belt conveyors onto designated output chutes, bins, or subsequent conveyors under programmed or manual control.

BACKGROUND OF INVENTION

In modern high volume package delivery systems, package delivery services utilize a variety of material handling systems. Such material handling systems often include package conveying systems that divert packages to a variety of output destinations such as chutes, bins, and subsequent conveyor systems. Systems for diverting objects from a moving conveyor have been available for many years. Such systems are useful in discharging objects from a conveying surface at selected stations located along the path of the conveying surface.

Typical package diverting systems utilize a pusher element or member mounted on or beneath a conveying surface which when actuated ejects a package laterally across the conveying surface to a desired discharge station. Many such systems guide a pusher element laterally across the conveying surface using a complex series of guide tracks, or cams mounted beneath the conveying surface. Other systems utilize a means for elevating and tilting a package above and away from the upper surface of a conveying surface so that the package may be withdrawn to an awaiting chute or discharge station. Still other systems have been known to collapse the conveying surface such that the package falls to a subjacent conveying surface on which the package is translated to a desired discharge location.

U.S. Pat. No. 1,549,499 discloses an elevating means for use in connection with roller bed sorting tables for raising a box or parcel a slight distance above the plane of the roller bed to allow the box or parcel to be withdrawn to an awaiting chute or discharge station. A box or parcel to be discharged is brought to a state of rest at a sorting station immediately above an elevating roller. The elevating roller is raised by depressing a foot lever. The box or parcel positioned over the elevating roller is raised off the roller bed which allows an operator to pull the box or parcel off the roller bed on to an adjacent chute or discharge station.

A box or parcel switching unit for discharging a box sideways on to an adjacent storage conveyor or chute is disclosed in U.S. Pat. No. 2,062,604. A box or parcel is brought to a stopped position on a receiving conveyor and overlying a discharge conveyor. The receiving conveyor is dropped from beneath the box or parcel allowing it to come to rest on the discharge conveyor. The box or parcel is then translated off the surface of the discharge conveyor to an awaiting adjacent conveyor or chute.

U.S. Pat. No. 3,138,238 discloses a conveyor system with a powered diverter for diverting an object from the surface of a main conveyor to an awaiting side conveyor. The powered diverter includes an assembly of diverting wheels that are oriented toward the side conveyor. The group of diverting wheels are normally positioned below the upper surface of the main conveyor so that objects traveling on the main conveyor do not contact the diverting wheels. In order to divert an object from the main conveyor to the side conveyor, the diverting wheels are elevated so that they are slightly above the upper surface of the main conveyor. Accordingly, an object traveling down the main conveyor is diverted by contact with the elevated diverting rollers.

U.S. Pat. No. 1,462,511 discloses another conveyor diverter. A side conveyor extends perpendicular from a main conveyor. A set of diverting rollers are configured perpendicular to the main conveyor and are raised above the upper surface of the main conveyor to cause an object to be diverted from the surface of the main conveyor under force of gravity across the set of diverting rollers.

In most of those systems, diverter mechanisms are utilized to divert an object from the upper surface of a conveying surface by bringing the object to a complete stop overlying the diverter mechanism and then either raising the diverter mechanism or lowering the object so that the diverter mechanism comes into contact with the object. Bringing the object to a complete stop prior to being diverted causes a significant reduction in the efficiency and speed of operation of the conveyor system. Some of those systems move a diverter into the path of a moving object. Problems associated with those systems include the inability to eject objects laterally from the surface of a moving conveying system at ejection speeds which are independent of the speed of the moving conveyor system.

Other limitations in the prior art include an inability to eject objects laterally at a high speed without encountering rotation of the package or object as it is discharged from the surface of the moving conveyor. And, such systems may be noisy and relatively difficult to repair when diverter systems components fail.

Thus, there is a need in the art for a sorting conveyor system that can discharge or eject an object from a conveying surface without bringing the object to a stop and without changing the position or speed of the conveying surface. There is also a need in the art for a sorting conveyor system that can discharge or eject an object from a conveying surface at high speeds and without undesired rotation of the object during discharge. There is further a need in the art for a sorting conveyor system that is quite during operation and which is easily repaired.

SUMMARY OF THE INVENTION

The present invention seeks to provide an improved system for efficiently discharging items of various sizes and weights from a moving conveying surface. The present invention allows an object to be discharged laterally from the surface of a moving conveyor independent of the speed of the moving conveyor. An object may be discharged without raising an object diverter or ejection mechanism into the path of the moving object and without lowering the conveying surface to allow a moving object to contact a subjacent object diverter or ejection mechanism. The present invention is simple in construction and may be easily maintained by the quick removal and substitution of failed components. The present invention decreases noise levels by employing a discharge drum which includes a flexible contact material.

Generally described, one aspect of the present invention includes a mechanism for ejecting an object from a support surface, including an ejection member mounted for rotation about a fixed axis subjacent to the support surface. The ejection member has first and second opposing sides. The support surface has an opening for receiving one of the first and second opposing sides of the ejection member. A means is provided for rotating the member about the axis such that the one of the first and second opposing sides rotates through the opening and above a plane defined by the support surface to eject the object from the support surface. The means for rotating the ejection member may comprise an electric motor. The ejection member may have the shape of an asymmetric drum mounted on a horizontal axis below the support surface.

Preferably, the rotation of the one of the first and second opposing sides defines an arcuate path, the arcuate path beginning below the plane defined by the support surface, and the arcuate path terminating below the plane defined by the support surface. As the one of the first and second sides rotates through the opening and above the plane defined by the support surface, the one of the first and second sides engages a lower surface of the object, the object being lifted from the support surface, the object being tilted away from the support surface, and the object being discharged to a designated discharge location. Preferably, the first and second opposing sides are generally convex shaped and define a plurality of flexible ridges.

The ejection member may have first and second ends, the first and second sides being interposed between the first and second ends. Each of the first and second sides may be tapered from the second end to the first end, such that the width of the ejection member is greater at the second end than at the first end.

If desired, the support surface may comprise a pair of continuous conveyors for transporting the object, the pair of continuous conveyors disposed in parallel, spaced-apart relation, and the ejection mechanism may be disposed medially of the pair of continuous conveyors. The opening defined by the support surface may comprise a space interposed between the pair of continuous conveyors.

Alternatively, the support surface may further comprise a roller bed conveyor for transporting the object, the roller bed conveyor defining a pair of spaced-apart arrays of rollers, the rollers defining axes of rotation, the axes of rotation being transverse to the axis of rotation of the ejection member, and the ejection mechanism may be disposed medially of the pair of spaced apart arrays of rollers. The opening defined by the support surface may comprise a space interposed between the pair of spaced-apart arrays of rollers.

In another aspect of the present invention a sorting conveyor system is provided, comprising a pair of continuous conveyors for transporting an object, the pair of continuous conveyors disposed in parallel, spaced-apart relation, and a means for ejecting an object from an upper surface of the pair of continuous conveyors. The ejecting means is disposed medially of the pair of continuous conveyors and is disposed subjacent to the upper surface of the pair of continuous conveyors. The ejecting means rotates about an axis, the axis remaining in a fixed plane relative to the upper surface during the rotation about the axis.

Preferably, the ejecting means includes an ejection member, and an opening preferably is defined between the pair of continuous conveyors, the opening receiving the ejection member, the ejection member rotatably engaging a lower surface of the object. The ejection member may comprise an outer contact surface for engaging the lower surface of the object. During rotation of the ejection member, the contact surface rotates through an arcuate path. The arcuate path begins below the plane defined by the upper surface, the path rises above the plane defined by the upper surface, and the path terminates below the plane defined by the support surface. A plurality of discharge destinations may be disposed adjacent to and on either side of the conveyors.

A mechanism for driving the pair of continuous conveyors may be provided, the mechanism comprising a drive means configured for engagement with each of the pair of continuous conveyors, and the drive means applying rotational force to the pair of continuous conveyors. A pair of snub rollers may be provided for maintaining the engagement of the drive means with the pair of continuous conveyors. A tensioning mechanism may be provided for maintaining desired tension in the pair of continuous conveyors.

The tensioning mechanism preferably comprises a spring for urging the drive means into engagement with the pair of continuous conveyors and a spring retaining member interposed between the spring and the drive means. A means for compressing and decompressing the spring against the spring retaining member may also be provided. The means for compressing and decompressing the spring may comprise a hydraulic cylinder, and the drive means may comprise a gear motor configured for engagement with a toothed surface of each of the pair of continuous conveyors.

In another aspect of this invention a sorting conveyor system is provided, comprising a pair of continuous conveyors for transporting an object. The pair of continuous conveyors are disposed in parallel, spaced-apart relation and a discharge mechanism is provided for discharging an object from an upper surface of the pair of continuous conveyors. The discharge mechanism comprises a discharge drum rotatably supported about an axis, the axis lying in a fixed plane medially of and subjacent to the upper surface, the axis lying parallel to the pair of continuous conveyors. The discharge drum defines a generally rectangular transaxial cross-section having upper and lower surfaces and first and second opposing sides, the first and second opposing sides being adjacent to the upper and lower surfaces. A means is provided for rotating the discharge drum about the axis such that one of the first and second opposing sides of the discharge drum arcuately translates between the pair of continuous conveyors and above the upper surface of the continuous conveyors. During rotation, the one of the first and second opposing sides contacts a lower surface of the object such that the object is lifted, tilted, and translated from the upper surface of the pair of continuous conveyors.

Preferably, the discharge drum further comprises first and second ends, the first and second opposing sides being interposed between the first and second ends. The first and second opposing sides taper from the second end to the first end such that the discharge drum is wider at the second end than at the first end. The first and second opposing sides may define flexible ridges. The first and second sides may taper from the second end to the first end in a direction opposite the direction of travel of the pair of continuous conveyors.

In another aspect of the present invention, a method of ejecting an object from a support surface is provided, comprising the steps of rotating an ejection member about an axis fixed beneath the support surface; rotating a first side of the ejection member through an opening defined in the support surface; contacting the object with the first side of the ejection member; and discharging the object from the support surface. The step of discharging the object preferably includes the steps of lifting said object from the support surface; tilting the object away from the support surface; and translating the object laterally off the support surface to a desired discharge destination. If desired, the method may further comprise the steps of conveying the object along the support surface to a desired discharge destination and counteracting rotation of the object during the step of discharging the object from the support surface. The support surface may comprise a pair of continuous conveyors.

Other objects, features, and advantages of the present invention will become apparent upon review of the following description of preferred embodiments and the appended drawings and claims.

DETAILED DESCRIPTION

Figure 1:
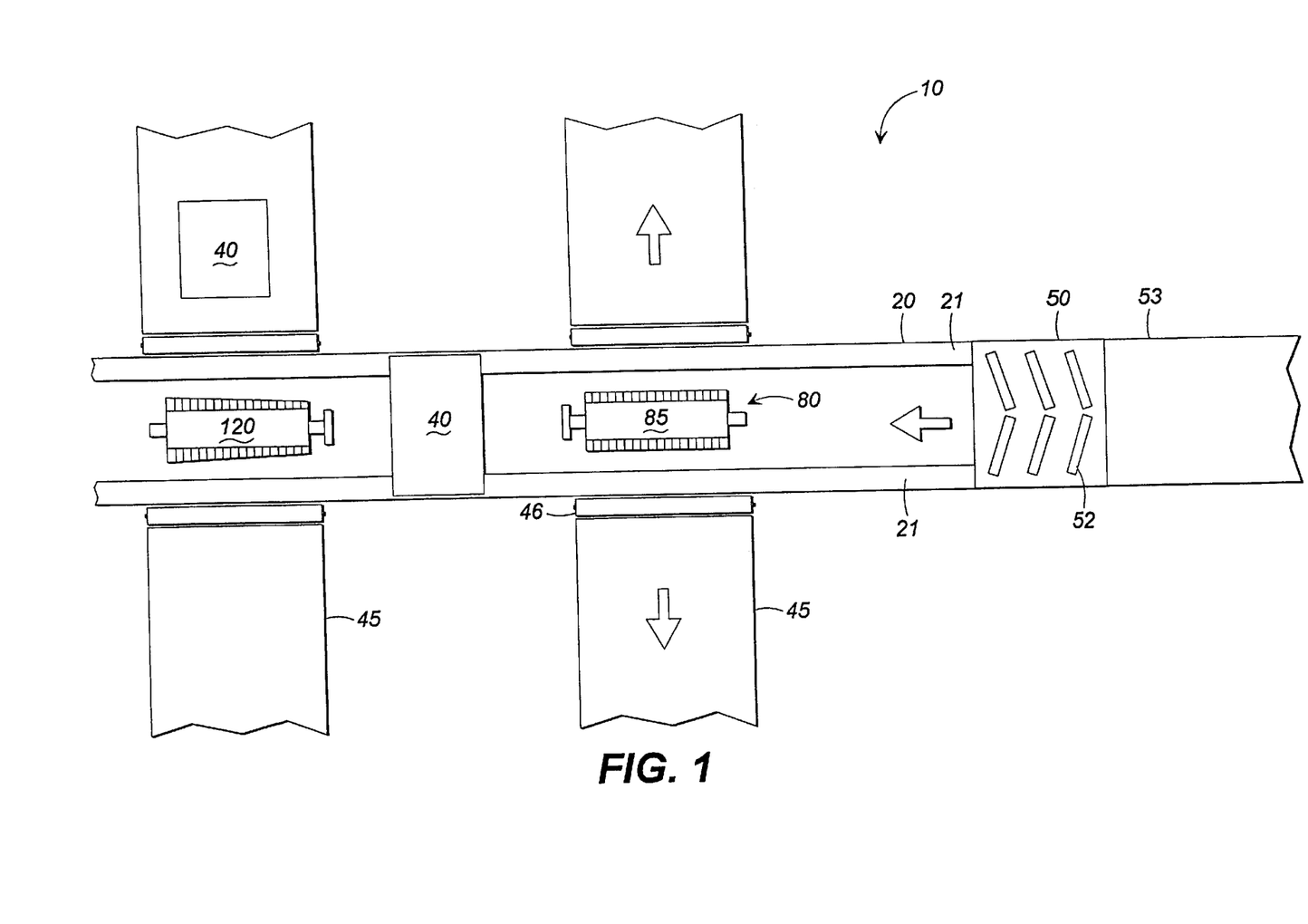
FIG. 1 is a top plan view of an automated sorting system embodying the present invention.
Figure 2:
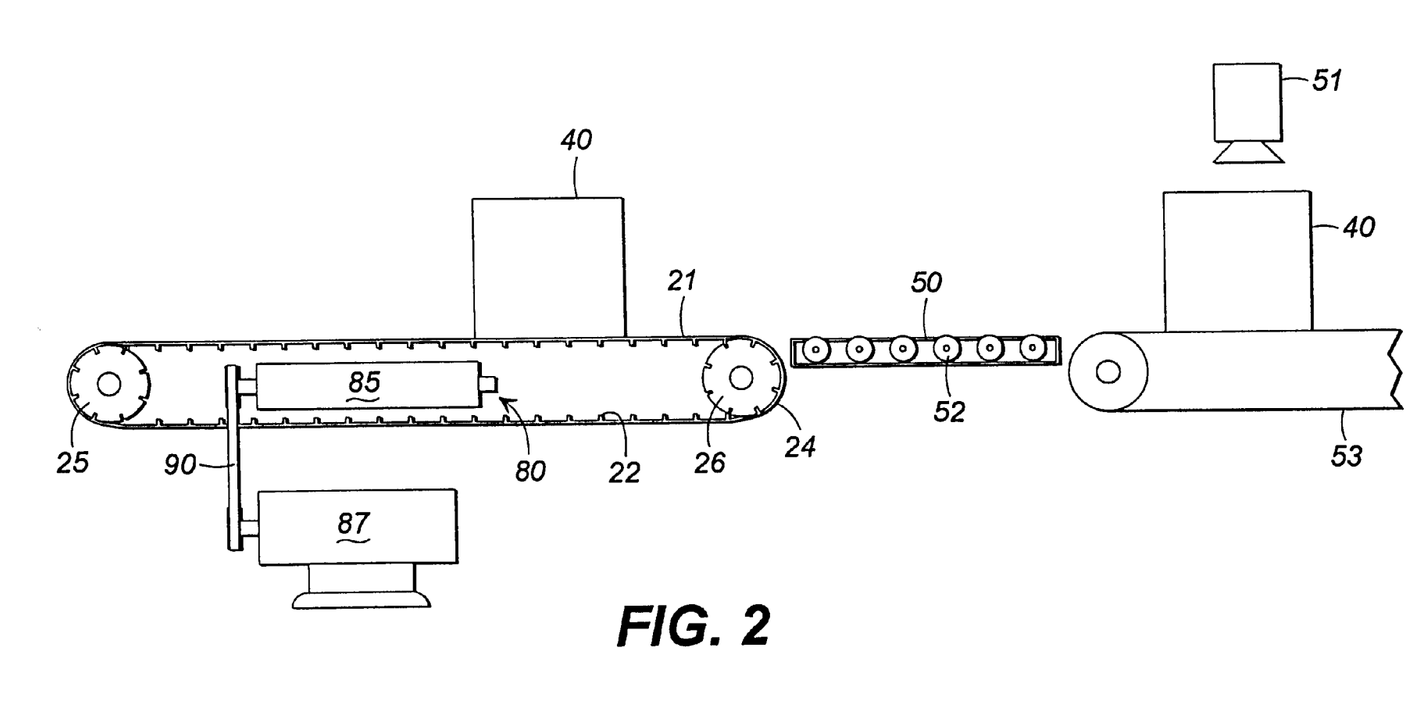
FIG. 2 is a side diagrammatic view of the automated sorting system of FIG. 1.
Figure 3:
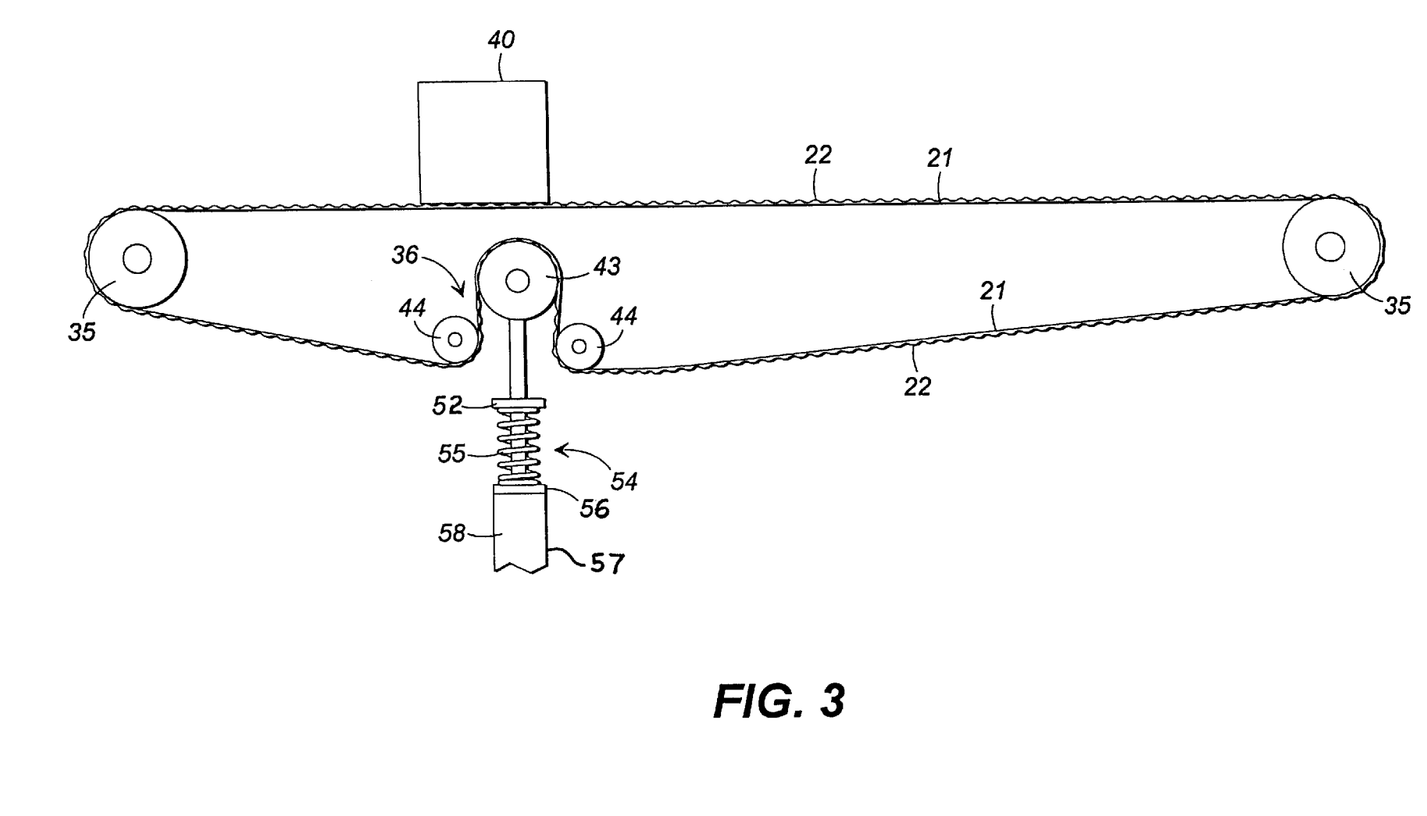
FIG. 3 is a side diagrammatic view of a cog belt conveyor system showing a self-tensioning gear motor drive system.

Referring now in more detail to the drawings, in which like numerals refer to like parts throughout the several drawings, FIG. 1 shows a top plan view of an automated sorting system embodying the present invention. With reference to FIGS. 1, 2 and 3, the sorting system 10 preferably includes a cog belt conveyor system 20 comprised of a pair of continuous cog belt conveyors 21 positioned in parallel spaced-apart relation. In a preferred form shown, the cog belt conveyor system 20 forms a closed loop. As shown in FIGS. 1 and 2, the cog belt conveyor system 20 may include a plurality of ejection mechanisms 80 for discharging items, such as parcels 40, from the surface of the parallel cog belt conveyors 21 onto a variety of output destinations such as receiving chutes 45, a parallel conveyor (not shown), or a non-parallel conveyor (not shown).

Figure 6:
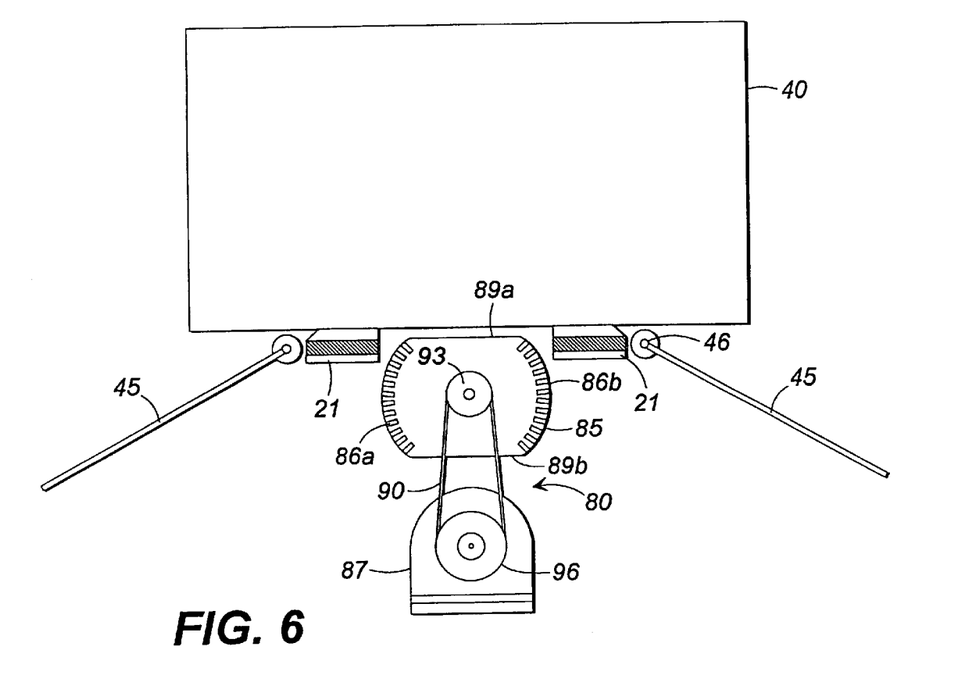
FIG. 6 is an end view of a discharge drum ejection mechanism of the present invention.

The parcels 40 may be loaded onto the cog belt conveyor system 20 manually or by a feed conveyor 53. A conventional centering roller bed 50 may be used to properly orient the parcels 40 onto the conveying surfaces of the cog belt conveyors 21, as shown in FIG. 1. Other sub-assemblies of the sorting system 10 include a self-tensioning gear motor drive system 36 for providing proper tension in the cog belt conveyors 21 of the cog belt, conveyor system 20, as shown in FIG. 6. The assemblies and sub-assemblies thus far noted and shown will now be described in detail.

Referring still to FIGS. 1 and 2, the cog belt conveyor system 20 is comprised of a pair of cog belt conveyors 21 configured in spaced-apart relation for transporting an object such as parcel 40 on the upper surface of the cog belt conveyors 21. In the preferred form shown, the cog belt conveyors 21 include a smooth outer conveying surface. Cog teeth 22 are disposed along the inner surface of the cog belt conveyors 21 for engaging a cog belt drive mechanism 24. The drive mechanism 24 preferably includes a drive sprocket 26 configured for engagement with the cog teeth 22 disposed along the inner surface of the cog belt conveyors 21, as shown in FIG. 2. An electric motor (not shown) is preferably functionally attached to the drive sprocket 26. As shown in FIG. 2, the cog belt conveyors 21 are supported at the end opposite the cog belt drive means 24 by an idle sprocket 25.

A feed conveyor 53 is provided for automatically loading objects, such as parcel 40, onto the cog belt conveyor system 20. A centering roller bed 50 is interposed between the feed conveyor 53 and the cog belt conveyor system 20. The centering roller bed 50 is comprised of a plurality of rollers 52 configured in a herringbone configuration. Preferably, the roller bed 50 serves to center and properly orient an object such as a parcel 40 onto the parallel cog belt conveyors 21, as shown in FIG. 1. As shown in FIG. 1, a plurality of discharge chutes 45 are provided adjacent to the cog belt conveyors 21 for receiving parcels 40 discharged from the surface of the cog belt conveyors 21, as will be discussed and detailed below. It should be understood, that a variety of discharge destinations may be utilized, such as bins and separate conveyors (not shown).

An alternate configuration for the cog belt conveyor system 20 is shown in FIG. 3. In the alternate configuration for the cog belt conveyor system 20, the cog belt conveyors 21 are supported by a pair of idler rollers 35. As shown in FIG. 3, the cog belt conveyors 21 of this embodiment are disposed about the idler rollers 35 such that the outer conveying surface of the cog belt conveyors 21 include cog teeth for engagement with a self-tensioning gear motor drive system 36. The inner surface of the cog belt conveyors 21 are smooth for engagement with the idler rollers 35.

Figure 4:
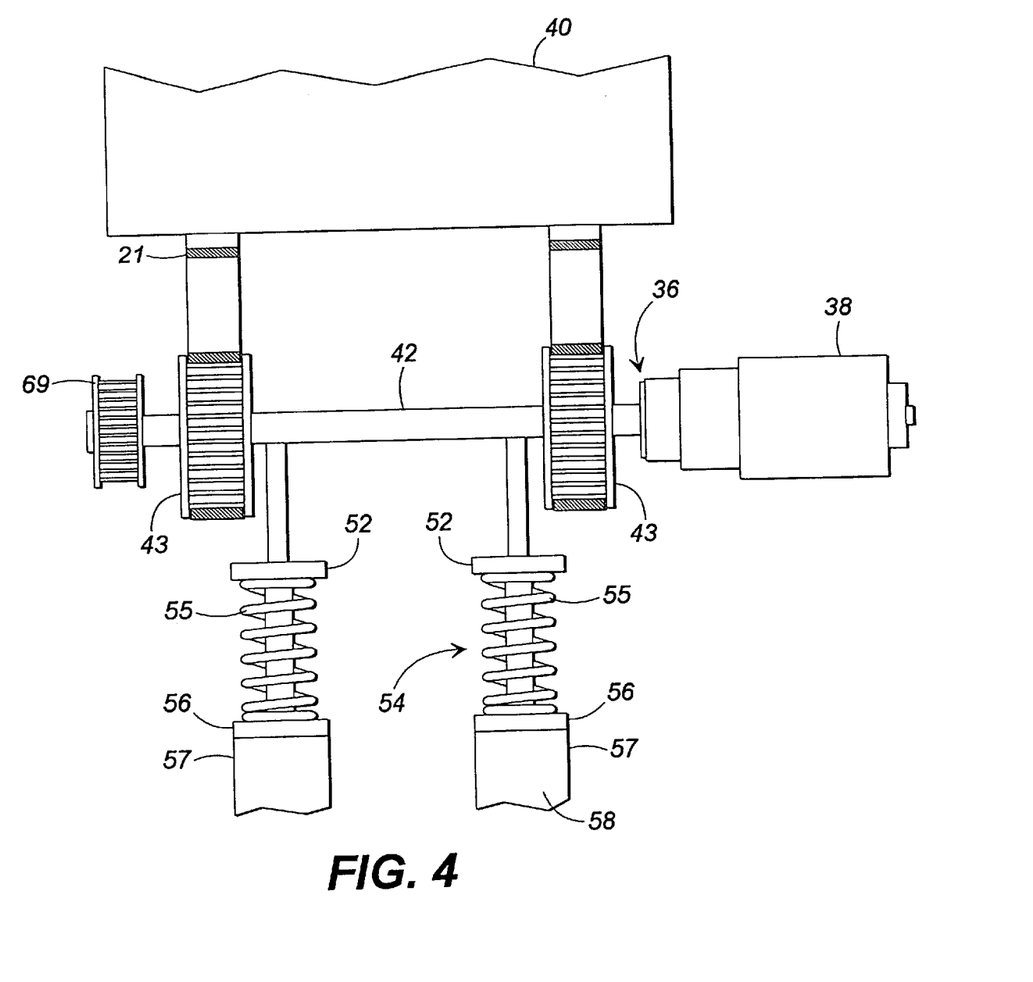
FIG. 4 is an end view of part of the gear motor drive system of FIG. 3.

The self-tensioning gear motor drive system 36 includes a reversible gear motor 38. As shown in FIG. 4, the reversible gear motor 38 is attached to a drive shaft 42 on which is disposed a pair of drive sprockets 43 for engaging and driving the pair of parallel cog belt conveyors 21. As shown in FIG. 3, a pair of snub rollers 44 are utilized to keep the cog belt conveyors 21 in continuous engagement with the drive sprockets 43.

A tensioning mechanism 54 is provided for maintaining proper tension in the cog belt conveyors 21 of this embodiment of the present invention. As shown in FIG. 4, the tensioning mechanism 54 is comprised of a tension spring 55 which is retained by a spring retaining member 52. At the lower end of the tension spring 55 is a spring compression and release member 56. The spring compression and release member 56 is actuated by hydraulic cylinder 57 which contains hydraulic fluid 58. As is well known to those skilled in the art, a suitable pneumatic cylinder may be used in place of the hydraulic cylinder 57. Tension in the cog belt conveyors 21 may be increased by manually actuating the hydraulic cylinder 57, or operation of the tensioning mechanism 54 may be directed by a programmable logic controller (not shown). It should be understood, that a variety of tension spring mechanisms may be used in place of the tensioning mechanism 54 for manually or automatically maintaining constant tension in the cog belt conveyors 21.

Figure 5:
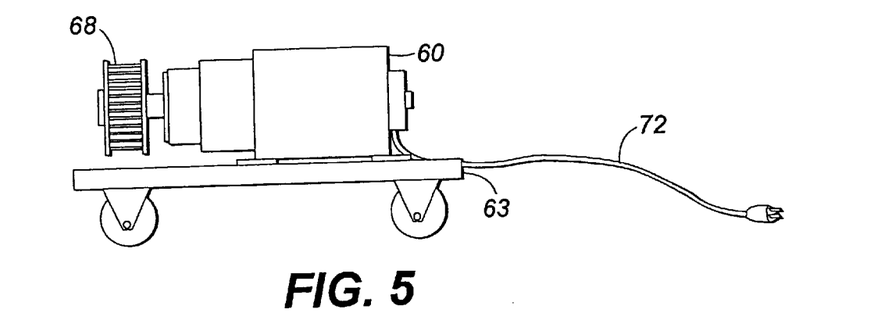
FIG. 5 is a side elevation view of a portable gear motor mounted on a wheeled table.

Referring now to FIGS. 4 and 5, a portable gear motor 60 is provided for powering the sprockets 40 and cog belt conveyors 21 in the event of a failure of the reversible gear motor 38. As show in FIG. 4, the portable gear motor 60 is mounted on a wheeled table 63 to allow the portable gear motor 60 to be moved into any desired position. As shown in FIG. 4, an emergency drive sprocket 68 is disposed on the end of the drive shaft 42 opposite the reversible gear motor 38. As shown in FIGS. 4 and 5, the portable gear motor 60 includes a drive sprocket 69 for engagement with the emergency drive sprocket 68. A power cord 72 is included for providing power to the portable gear motor 60.

Referring now to FIGS. 1, 2, 6 and 7, the sorting system 10 includes a plurality of ejection mechanisms 80 for ejecting an object, such as a parcel 40, laterally from the upper surface of the cog belt conveyors 21 to an adjacently disposed discharge destination, such as a chute 45, or other desired discharge destination, such as a bin, or alternate conveyor. The ejection mechanism 80, shown in FIGS. 1 and 6, is disposed medially of the parallel cog belt conveyors 21. The ejection mechanism 80 is mounted subjacent to the upper surface of the cog belt conveyors 21.

Figure 7:
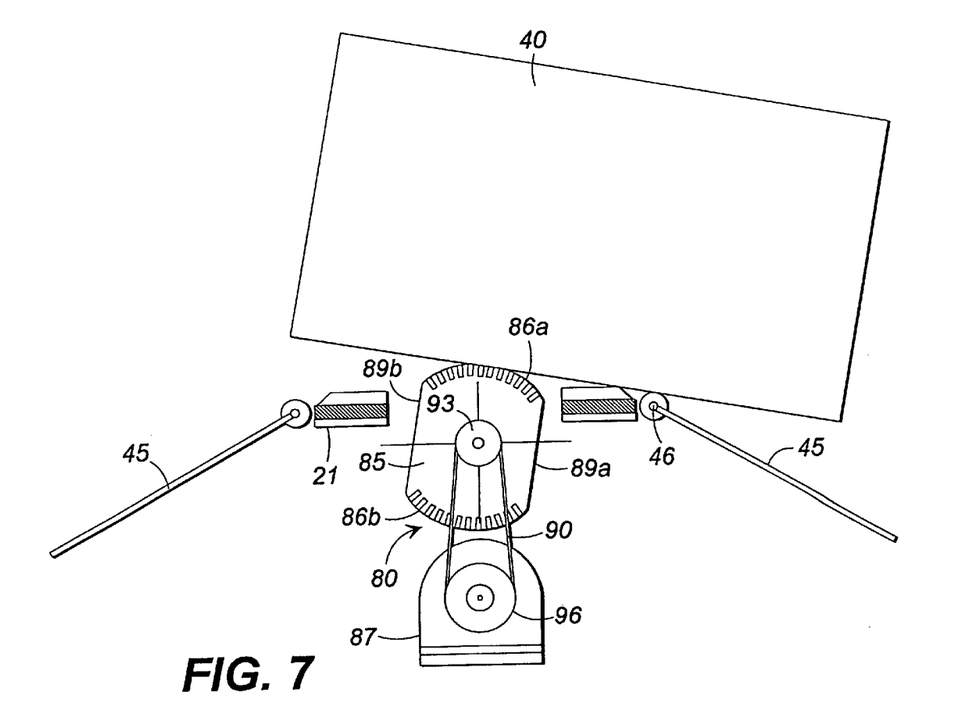
FIG. 7 is an end view of the discharge drum ejection mechanism of FIG. 6, showing a parcel being discharged to a discharge chute.
Figure 8:
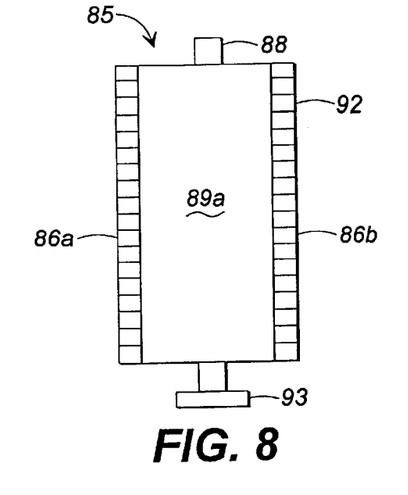
FIG. 8 is a top plan view of a discharge drum of the present invention.

The ejection mechanism 80 includes a discharge drum 85 and a discharge drum drive motor 87, as shown in FIGS. 6, 7 and 8. As shown in FIGS. 6 and 8, the discharge drum 85 is an elongate member defining a generally rectangular transaxial cross-section and having upper and lower surfaces 89a and 89b. The discharge drum 85 has first and second opposing sides 86a and 86b. which are disposed adjacent to the upper and lower surfaces 89a and 89b. The first and second opposing sides 86a and 86b are generally convex shaped and are separated by the longer cross-sectional diameter of the discharge drum 85.

As shown in FIGS. 6, 7 and 8, a plurality of flexible ridges 92 are disposed along the surfaces of the convex opposing sides 86a and 86b of the discharge drum 85. The flexible ridges 92 may be made from any suitable polymer material such as polyurethane. As will be discussed below, the flexible ridges 92 assist in ejecting an overlying object, such as the parcel 40 from the conveying surface of the cog belt conveyors 21.

A discharge drum drive shaft 88 is configured through the central longitudinal axis of the discharge drum 85. A discharge drum drive sheave 93 is attached to one end of the discharge drum drive shaft 88, as shown in FIG. 8. As shown in FIG. 6, a reversible discharge drum drive motor 87 includes a drive motor sheave 96 for driving a drive belt 90 to impart rotation to the discharge drum 85. As shown in FIGS. 1, 6 and 7, the axis of rotation of the discharge drum 85 is defined by the discharge drum shaft 88. The axis of rotation of the discharge drum 85 lies along the axial center of the path of travel of the cog belt conveyors 21. As shown in FIGS. 6 and 7, the axis of rotation of the discharge drum 85 remains fixed beneath the conveying surfaces of the cog belt conveyors 21.

In operation, the ejection mechanism 80 is used to discharge an object such as the parcel 40 from the upper surface of the cog belt conveyors 21, as shown in FIG. 7. The configuration of the ejection mechanism 80, as shown in FIG. 6, represents the rest state of the ejection mechanism 80. When the ejection mechanism is at rest, as illustrated in FIG. 6, the upper surface 89a of the discharge drum 85 is in the up position, as shown in FIG. 6. In this configuration, the upper surface 89a lies subjacent to the conveying surfaces of the cog belt conveyors 21. Accordingly, an object, such as a parcel 40, may freely travel over the ejection mechanism 80, if desired.

In order to eject the parcel 40 to an adjacent chute 45, as shown in FIG. 7, the discharge drum drive motor 87 is energized when the parcel 40 moves into a position immediately above the ejection mechanism 80. If it is desired that the parcel 40 be discharged to a chute 45 located to the right of the ejection mechanism 80, the discharge drum drive motor is energized so that the discharge drum rotates in a clockwise manner, as shown in FIG. 7. It should be understood, however, that the parcel 40 may be discharged to the chute 45 located to the left of the ejection mechanism 80 by reversing the polarity on the discharge drum drive motor 87 in a manner well known to those skilled in the art.

As shown in FIG. 7, energization of the discharge drum drive motor rotates the discharge drum 85 clockwise or counterclockwise, as desired. As the discharge drum 85 rotates, one of the two convex opposing sides 86a rotates through an arcuate path. The arcuate path begins below a plane defined by the upper surface of the cog belt conveyors 21 and rises above that plane through an opening defined by the space between the cog belt conveyors 21 or between the roller arrays, shown in FIG. 9 and discussed below. The arcuate path then terminates below the plane defined by the surface of the cog belt conveyors 21.

Accordingly, one of the convex opposing sides 86a contacts the lower surface of the parcel 40, as shown in FIG. 7, and lifts the parcel 40 up and away from the surface of the cog belt conveyors 21. The flexible ridges 92 disposed on the surfaces of the convex opposing sides provide contact surfaces to assist in movement of the parcel 40 by increasing friction between the convex opposing side and the parcel 40.

As the discharge drum 85 continues to rotate, the parcel 40 is tilted away from the upper surfaces of the cog belt conveyors 21 and onto an idler roller 46 interposed between the cog belt conveyors 21 and the chutes 45, as shown in FIG. 7. Finally, as the discharge drum 85 completes a full 180 degrees of rotation, the parcel 40 is translated onto the chute 45 and off the conveying surfaces of the cog belt conveyors 21. Accordingly, rotation of the discharge drum 85, as described, lifts, tilts, and translates the parcel 40 from the conveying surfaces of the cog belt conveyors 21, and such rotation returns the discharge drum to a rest position, as shown in FIG. 6.

Figure 9:
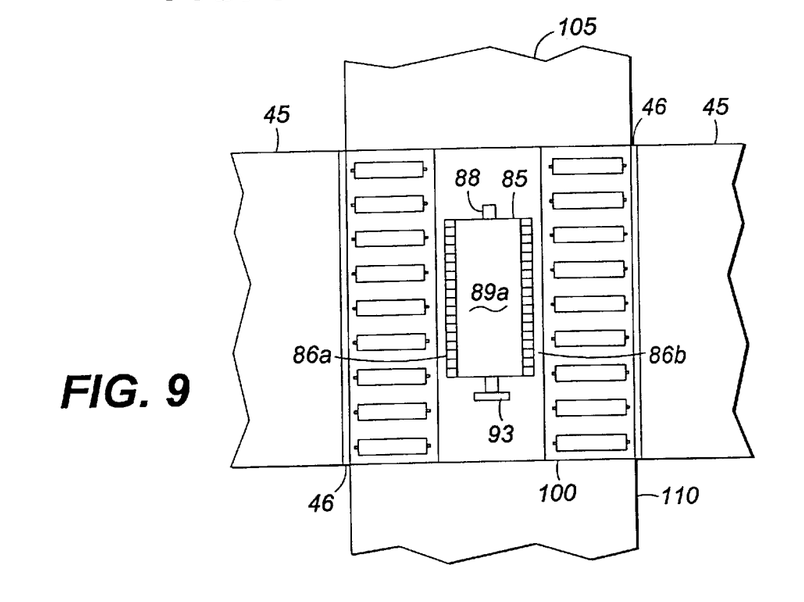
FIG. 9 is a top plan view of a roller bed sorting system embodying the present invention.

As shown in FIG. 9, an alternate embodiment of the present invention provides an ejection mechanism 80 disposed beneath the conveying surface of a roller bed conveyor 100. The roller bed conveyor 100 defines a pair of spaced-apart arrays of rollers. It should be understood that the rollers may be powered or non-powered idler rollers. The rollers define axes of rotation which are transverse to the axis of rotation of the discharge drum 85. The roller bed conveyor 100 and ejection mechanism 80 may be positioned adjacent to desired discharge destinations and interposed between two belt conveyors 105 and 110, or the ejection mechanism and roller bed 100 configuration shown in FIG. 9 may form part of a continuous roller bed conveyor arrangement (not shown).

Figure 10:
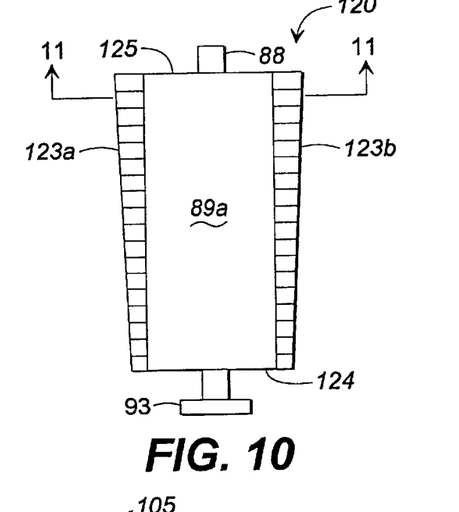
FIG. 10 is a top plan view of a tapered discharge drum of the present invention.
Figure 11:
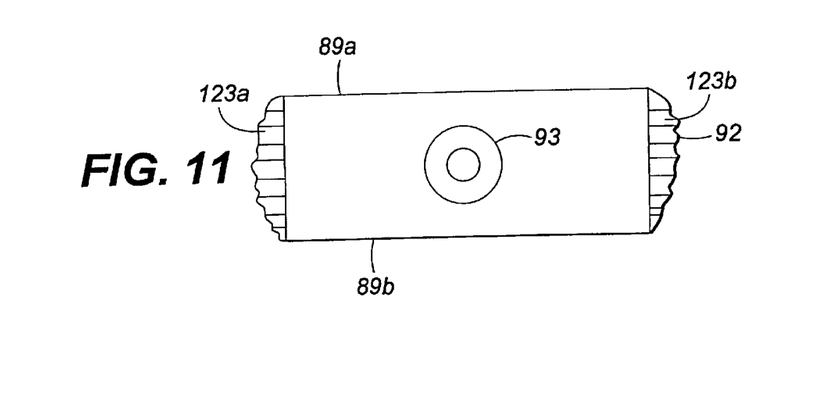
FIG. 11 is a transaxial cross-sectional view of the tapered discharge drum of FIG. 10.

A tapered discharge drum 120 is shown in FIGS. 10 and 11. As shown in FIG. 11, a transaxial cross-sectional view of the tapered discharge drum 120 shows a generally rectangular shaped discharge drum 120, defining convex opposing sides 123a and 123b separated by the longer diameter of the drum. As shown in FIG. 10, the convex opposing sides 123a and 123b of the tapered discharge drum 120 define flexible ridges 126 and are tapered longitudinally, narrowing toward the end having the drive sheave 96 for engagement with the drum drive motor 87 via a drive belt 90, as shown in FIG. 6. As shown in FIG. 1, the tapered discharge drum also tapers longitudinally narrowing in the direction opposite to the of travel of the cog belt conveyors 21. Accordingly, the second end 125 of the tapered discharge drum 120 is wider than the first end 124.

Discharge of a parcel 40 using the non-tapered discharge drum 85, as described above, tends to rotate the parcel 40 as the parcel 40 is being discharged. Rotation of the parcel is a result of the forward movement of the parcel 40 along the cog belt conveyors 21 in concert with the lateral displacement of the parcel 40 by the discharge drum 85. More specifically, as the tapered discharge drum 85 lifts the parcel 40 off one of the cog belt conveyors 21, the other cog belt conveyor continues to urge the parcel in a forward direction, resulting in an unbalanced force that causes rotation of the parcel 40. If desired, the tapered discharge drum 120 may be utilized to counteract rotation of the parcel 40 as it is discharged from the cog belt conveyors 21, as shown in FIG. 7. That is, as a parcel 40 is discharged from the surface of the cog belt conveyors 21 by the tapered discharge drum, the parcel 40 is contacted first by the wider second end 125 of the tapered discharge drum 120 which urges the parcel 40 in a direction counter to the direction of rotation caused by the cog belt conveyor 21. Accordingly, the parcel 40 is discharged from the conveying surfaces of the cog belt conveyors 21 without undesired rotation.

It should be understood the ejection mechanism need not be a drum and that the side of the ejection mechanism that engages the parcels 40 need not be a continuous surface.

OPERATION

The automated sorting system 10 is operated under the control of a digital controller, which may be a programmable logic controller (PLC) or a general purpose microprocessor which is found in a personal computer. Methods for programming such controllers to operate a sorting system of the type disclosed herein are conventional and known to those skilled in the art.

In operation, the number of and location of ejection mechanisms 80 and an identification code for each ejection mechanism 80 are input into the controller memory when movement of the sorting system 10 begins. Parcels 40 are induced sequentially onto the roller bed 50 from the feed conveyor 53, as shown in FIGS. 1 and 2. As shown in FIG. 1, a destination code for each parcel 40 is entered into the controller memory using an optical reader 51, a keypad (not shown), or a voice recognition input device (not shown) before the parcel 40 is directed onto the cog belt conveyor system 20. A suitable optical reader system 51 for imaging the destination code from a label affixed to the parcel 40 is shown in U.S. Pat. Nos. 5,291,564; 5,308,960; 5,327,171; and 5,430,282 which are incorporated herein by reference. The roller bed 50, with herringbone configuration rollers 52, centers the parcel 40 so that the parcel 40 squarely aligns about the longitudinal axis of the cog belt conveyor system 20 and on the surfaces of the cog belt conveyors 21, as shown in FIG. 1.

When the parcel 40 reaches a desired output destination, such as a chute 45 in a position overlying a desired ejection mechanism 80, the PLC energizes the discharge drum drive motor 87 to actuate the ejection mechanism 80. Accordingly, the discharge drum 85 rotates in the direction of the chute 45. As the discharge drum 85 rotates about the discharge drum drive shaft 88, one of the first and second convex shaped opposing sides arcuately translates between the pair of continuous cog belt conveyors 21 and above the upper surface of the continuous cog belt conveyors 21. The discharge drum 85 rotates in the direction of the chute 45, and the parcel 40 is lifted from the surfaces of the cog belt conveyors 21, as shown in FIG. 7. As the discharge drum 85 continues to rotate in the direction of the chute 45, the parcel 40 is tilted on to the idler roller 46, as shown in FIG. 7. Finally, as the discharge drum completes its rotation, as described in detail above, the parcel 40 is discharged onto the chute 45, as shown in FIG. 7. After the parcel 40 is discharged to the chute 45, the discharge drum 85 stops in a rest position, as shown in FIG. 6, and stands ready to discharge a subsequent parcel 40. If it is desired that package rotation be counteracted as the parcel is discharged to the chute 45, a tapered discharge drum 120 may be utilized instead of the discharge drum 85, as described above.

Use of the ejection mechanism 80, as described, allows the parcel 40 to be discharged from the surfaces of the cog belt conveyors 21 independent of the speed of the parcel 40 moving along the cog belt conveyors 21. Additionally, interaction of the flexible ridges 92 disposed along the surfaces of the convex opposing sides of the discharge drum 85 or the tapered discharge drum 120 reduces noise created by the impact of the discharge drum 85 with the overlying parcel 40. Advantageously, failure of an individual ejection mechanism 80, or the cessation of use of an individual ejection mechanism 80 for the maintenance purposes does not create downtime for the cog belt conveyor system 20. In the event of the cessation of use of an individual ejection mechanism 80, the PLC may direct parcels to be discharged to alternate discharge destinations and bypass the stopped ejection mechanism 80. Furthermore, the discharge drums may be quickly and easily replaced. Accordingly, downtime of the cog belt conveyor system 20 is reduced.

While the present invention in its various aspects has been described in detail with regard to preferred embodiments thereof, it should be understood that variations, modifications and enhancements may be made to the disclosed apparatus and procedures without departing from the spirit and scope of the present invention as defined in the appended claims.

What is claimed is:

1. A sorting conveyor system for discharging a package therefrom, said package having a bottom surface, said conveyor system comprising:

means for defining a package conveying support surface for supporting said bottom surface of said package, said package conveying support surface at least partially defining an opening adjacent thereto for providing access to a bottom portion of said package bottom surface;

an ejection member mounted for rotation about a fixed axis subjacent to said package conveying support surface, said ejection member having first and second opposing sides and two opposing and separate faces, said faces and said sides alternating in angular location about said fixed axis, said ejection member configured such that at most only one of said two opposing sides extends through said opening of said support surface, depending upon the angular orientation of said ejection member about said fixed axis; and means for rotating said ejection member about said axis such that for each complete rotation of said engaging member, each of said first and second opposing sides separately and individually rotates through said opening and above a plane partially defined by said package conveying support surface such that either of said first and second opposing sides could contact a package to eject said package from said support surface, and each of said first and second opposing faces being beneath said opening and below said plane defined by said support surface when said faces are parallel to said package conveying support surface.

2. The sorting conveyor system of claim 1, wherein said package conveying support surface is a first package conveying support surface, and further comprising means for defining a second package conveying support surface partially defining said plane, wherein said rotation of each of said one of said first and second opposing sides defines an arcuate path, said arcuate path beginning below said plane defined by said support surfaces, and said arcuate path terminating below said plane defined by said support surface.

3. The sorting conveyor system of claim 1, wherein, as each of said first and second sides rotates through said opening and above said plane defined by said package conveying support surfaces, each of said first and second sides can engage a lower surface of said package, such that said package can be lifted from said support surfaces, said package being tilted away from said support surfaces, and said package being discharged to a designated discharge location.

4. The sorting conveyor system of claim 1, wherein said first and second opposing sides are generally convex shaped.

5. The sorting conveyor system of claim 4, wherein said generally convex shaped first and second sides define a plurality of flexible ridges.

6. The sorting conveyor system of claim 5, wherein said ejection member has the shape of an asymmetric drum mounted on a horizontal axis below said support surface.

7. The sorting conveyor system of claim 5,
wherein said ejection member has first and second ends, said first and second sides being interposed between said first and second ends; and
wherein each of said first and second sides tapers from said second end to said first end, such that the width of said ejection member is greater at said second end than at said first end.

8. The sorting conveyor system of claim 1, wherein said means for defining said package conveying support surface further comprises:
a pair of continuous conveyors for transporting said package, said pair of continuous conveyors disposed in parallel, spaced-apart relation; and
wherein said ejection member is disposed generally medially of said pair of continuous conveyors.

9. The sorting conveyor system of claim 8, wherein said opening defined by said support surface comprises a space interposed between said pair of continuous conveyors.

10. The sorting conveyor system of claim 1, wherein said means for defining said package conveying support surface further comprises,
a roller bed conveyor for transporting said package, said roller bed conveyor defining a pair of spaced-apart arrays of rollers, said rollers defining axes of rotation, said axes of rotation being transverse to said axis of rotation of said ejection member; and
said ejection mechanism disposed medially of said pair of spaced-apart arrays of rollers.

11. The sorting conveyor system of claim 10, wherein said opening defined by said support surface comprises a space interposed between said pair of spaced-apart arrays of rollers.

12. The sorting conveyor system of claim 1, wherein said means for rotating said ejection member comprises an electric motor.

13. A sorting conveyor system, comprising:
a pair of continuous conveyors for transporting an object, said pair of continuous conveyors disposed in parallel, spaced-apart relation; and
a discharge mechanism for discharging an object from an upper surface of said pair of continuous conveyors, said discharge mechanism comprising;
a discharge drum rotatably supported about an axis, said axis lying in a fixed plane medially of and subjacent to said upper surface, said axis lying parallel to said pair of continuous conveyors,
said discharge drum defining a generally rectangular transaxial cross section having upper and lower surfaces and first and second opposing sides, said first and second opposing sides being adjacent to said upper and lower surfaces, and
means for rotating said discharge drum about said axis such that one of said first and second opposing sides of said discharge drum arcuately translates between said pair of continuous conveyors and above said upper surface of said continuous conveyors,
wherein said one of said first and second opposing sides contacts a lower surface of said object such that said object is lifted, tilted, and translated from said upper surface of said pair of continuous conveyors.

14. The sorting conveyor system of claim 13, wherein said discharge drum further comprises first and second ends, said first and second opposing sides being interposed between said first and second ends, and wherein said first and second opposing sides taper from said second end to said first end such that said discharge drum is wider at said second end than at said first end.

15. The sorting conveyor system of claim 14, wherein said first and second sides taper from said second end to said first end in a direction opposite the direction of travel of said pair of continuous conveyors.

16. The sorting conveyor system of claim 15, wherein each of said first and second opposing sides defines flexible ridges.

17. A sorting conveyor system for discharging a package from a package position thereon, said package having a bottom surface, said conveyor system comprising:
a frame;
means operably associated with said frame for defining a package conveying support surface configured for supporting said bottom surface of said package, said package conveying support surface at least partially defining an opening adjacent thereto, said opening configured for providing access to a bottom portion of said package bottom surface; and
an ejection member mounted for rotation about a fixed axis relative to said frame, said ejection member having first and second opposing and projecting sides, said ejection member configured such that for a given complete 360 degree rotation of said engaging member, said first opposing and projecting side first rotates through said opening and above a plane defined by said package conveying support surface in a manner suitable to discharge an object on said support surface, subsequently said ejection member rotates to a position which precludes contact with a package on said package conveying support surface, subsequently said second opposing and projecting side rotates through said opening and above a plane defined by said support surface in a manner suitable to discharge an object on said support surface, and finally said second opposing and projecting side rotates to a position which precludes contact with a package on said package conveying support surface.

18. The sorting conveyor system of claim 17, wherein said package conveying support surface comprises at least one conveyor.

19. The sorting conveyor system of claim 17, wherein said package conveying support surface comprises:

a pair of conveyors for transporting said package, said pair of conveyors disposed in parallel, spaced apart relation defining said opening therebetween for allowing said projecting sides of said ejection member to pass therethrough.

20. The sorting conveyor of claim 19, wherein said pair of conveyors include at least one continuous belt conveyor.

21. The sorting conveyor of claim 19, wherein said pair of conveyors include at least one roller bed conveyor portion.

22. The sorting conveyor system as claimed in 17, wherein said ejection member is mounted for rotation in either direction about said fixed axis, such that rotation can be 180 degrees in either direction from a central neutral position which precludes package contact, and such that a corresponding one of said first and second opposing sides passing through and out of said opening depending on the direction of rotation.

23. A mechanism for ejecting an object from a support surface comprising:

an ejection member mounted for rotation about a fixed axis subjacent to said support surface, said ejection member having first and second opposing sides, said support surface defining an opening for receiving one of said first and second opposing sides, wherein said first and second opposing sides are generally convex shaped, wherein said generally convex shaped first and second sides define a plurality of flexible ridges, wherein said ejection member has first and second ends, said first and second sides being interposed between said first and second ends, and wherein each of said first and second sides tapers from said second end to said first end, such that the width of said ejection member is greater at said second end than at said first end; and means for rotating said ejection member about said axis such that said one of said first and second opposing sides rotates through said opening and above a plane defined by said support surface to eject said object from said support surface.

24. A sorting conveyor system, comprising:

A) a pair of continuous conveyors for transporting an object, said pair of continuous conveyors disposed in parallel, spaced-apart relation;

B) means for ejecting an object from an upper surface of said pair of continuous conveyors, said ejecting means disposed medially of said pair of continuous conveyors, said ejecting means disposed subjacent to said upper surface of said pair of continuous conveyors, and said ejecting means rotating about an axis, said axis remaining fixed below said upper surface during said rotation about said axis; and C) a mechanism for driving said pair of continuous conveyors, said mechanism comprising:

1) a drive means configured for engagement with each of said pair of continuous conveyors, said drive means applying rotational force to said pair of continuous conveyors;

2) a pair of snub rollers for maintaining said engagement of said drive means with said pair of continuous conveyors; and 3) a tensioning mechanism for maintaining desired tension in said pair of continuous conveyors, wherein said tensioning mechanism comprises a spring for urging said drive means into engagement with said pair of continuous conveyors, a spring retaining member interposed between said spring and said drive means, and a hydraulic cylinder for compressing and decompressing said spring against said spring retaining member.

25. A sorting conveyor system, comprising:

A) a pair of continuous conveyors for transporting an object, said pair of continuous conveyors disposed in parallel, spaced-apart relation;

B) means for ejecting an object from an upper surface of said pair of continuous conveyors, said ejecting means disposed medially of said pair of continuous conveyors, said ejecting means disposed subjacent to said upper surface of said pair of continuous conveyors, and said ejecting means rotating about an axis, said axis remaining fixed below said upper surface during said rotation about said axis; and C) a mechanism for driving said pair of continuous conveyors, said mechanism comprising:

1) a drive means configured for engagement with each of said pair of continuous conveyors, said drive means applying rotational force to said pair of continuous conveyors, wherein said drive means comprises a gear motor configured for engagement with a toothed surface of each of said pair of continuous conveyors;

2) a pair of snub rollers for maintaining said engagement of said drive means with said pair of continuous conveyors; and 3) a tensioning mechanism for maintaining desired tension in said pair of continuous conveyors.

* * * * *